United States Patent [19]

Broadbent

[11] 4,353,090

[45] Oct. 5, 1982

[54] EXTENDED PLAY VIDEO RECORDING AND REPRODUCING SYSTEM WITH SELECTION OF MULTIPLEXED AUDIO

[75] Inventor: Kent D. Broadbent, Rancho Palos Verdes, Calif.

[73] Assignee: Discovision Associates, Costa Mesa, Calif.

[21] Appl. No.: 146,819

[22] Filed: May 5, 1980

Related U.S. Application Data

[62] Division of Ser. No. 50,188, Jun. 20, 1979.

[51] Int. Cl.³ .......................... H04N 5/76; H04N 5/78
[52] U.S. Cl. ........................................ 358/342; 360/9.1
[58] Field of Search ....................................... 360/8–11, 360/19; 358/127–132, 136, 147, 185, 128, 128.5, 128.6

[56] References Cited

U.S. PATENT DOCUMENTS

| | | | |
|---|---|---|---|
| 3,723,644 | 3/1973 | Haskell et al. | 360/9 |
| 3,908,080 | 9/1975 | Broadbent | 360/11 |
| 4,135,205 | 1/1979 | Takahashi | 358/127 |
| 4,198,656 | 4/1980 | Mathisen | 358/127 |

Primary Examiner—Aristotelis M. Psitos
Attorney, Agent, or Firm—Ronald J. Clark

[57] ABSTRACT

A video recording system, and related reproducing system, best suited for use in making and reproducing video disc recordings, wherein each recorded frame of video information represents one or more frames of an original video program, as designated by a frame repeat count encoded with the video information. In the recording system, the video program is preprocessed to designate sets of consecutive frames that will be recorded as a single frame, together with an encoded frame repeat count, and time delay circuits are employed to provide an audio signal for each of the original frames, all of which are recorded with the single video frame. In the reproducing system, the frame repeat counts are decoded, successively counted down, and used to control movement of a reading transducer, either to repeat a frame or to read a next frame from the recording. The frame repeat count is also employed to select an appropriate audio signal for reproduction with each video frame.

13 Claims, 8 Drawing Figures

EXTENDED PLAY VIDEO RECORDING AND REPRODUCING SYSTEM WITH SELECTION OF MULTIPLEXED AUDIO

This is a Division of application Ser. No. 50,188, filed June 20, 1979.

BACKGROUND OF THE INVENTION

This invention relates generally to video recording and reproducing systems, and, more particularly, to such systems utilizing compression techniques for increasing the effective amount of video information that can be stored on, or retrieved from, a recording disc.

Various systems are available for recording signals at video frequencies on discs, tapes and other media, utilizing optical, magnetic, and other techniques. In particular, some disc recording systems utilize a radiant energy beam to effect an irreversible change to the disc surface, and thereby write information on the surface for later reproduction. Information can be recorded on a disc in the form of a continuous spiral track, in which case a recording transducer is continually translated in a radial direction as the disc is rotated. It is also possible to record video or non-video information in concentric circular recording tracks on a disc.

In order for video disc players to be competitive with video tape machines, the video discs employed should be capable of storing reasonable lengths of program material. Without some form of compression of the video information, the total amount of information that can be stored on a given disc is limited by the diameter of the disc, the width of the recorded track, and the lineal data density that can be written and reproduced by the system.

In accordance with a prior invention of the present inventor, now the subject of U.S. Pat. No. 3,908,080, entitled "Method of Making an Extended Play Video Disc Record", video information can be recorded in a compressed form on a disc. In this prior technique, instead of recording all of the video information only one out of a predetermined number of successive sequential video frames is recorded. For example, a compression ratio of two-to-one is obtained if alternate frames can be recorded, and the data storage requirement is then reduced by fifty percent. On playback, each recorded frame is reproduced twice, and provision is made to preserve the audio information corresponding to all of the original frames of video information.

Although the system described and claimed in the aforementioned patent represented a substantial advance in the field of the invention, there are many situations in which such a technique is not wholly satisfactory. When the video image changes very rapidly, it would be more satisfactory to record and reproduce every frame of the program in sequence. Similarly, there may be other occasions when there is practically no change in picture content over several consecutive frames, in which case a compression ratio of even greater than two-to-one would be desirable. Consequently, there has existed, until the present invention, a need for a more versatile video compression system than the one described in the aforementioned patent. The present invention satisfies this need.

SUMMARY OF THE INVENTION

The present invention resides in a recording and reproducing system in which the video content of a recording is selectively compressed in accordance with the rate of change of the video picture content. The video information can be compressed by a compression ratio that can be varied between a relatively high value, when the picture content is changing slowly, to a value of unity, when the picture content is changing rapidly.

Briefly, and in general terms, the recording system of the invention includes a video disc recording device, audio processing means for producing a plurality of audio channels delayed in time with respect to each other by increments one video frame-time, and video processing means for generating a recorder enabling signal for each frame of an original video program that is to be recorded, and for generating a frame repeat count indicative of the number of times that each recorded frame is to be repeated during subsequent playback of the recording. The recording system also includes means for coupling the recorder enabling signal to the disc recording device, such that the device is enabled only for those frames that are to be recorded, and means for combining the plurality of audio channels with the video information to be recorded, such that a composite video and audio signal is recorded on the disc.

The reproducing system of the invention includes a video disc reproducing device, means for decoding frame repeat counts encoded in the recorded video signal, and means responsive to the decoded repeat count, for controlling the position of a reproducing transducer in such a manner as to read each frame of recorded video information a selected number of times. The reproducing system of the invention also includes means for separating and decoding the plurality of channels of audio information recorded on the disc, and means for selecting one of the audio channels for reproduction, based upon the value of the decoded repeat count, and the number of times that a frame has been repeated.

In the illustrative embodiment of the invention, a video program to be recorded is first pre-processed to generate a pre-processed audio tape and a pre-processed video tape. The pre-processed audio tape contains a plurality of channels of audio information delayed in time with respect to each other. For example, the second audio channel is delayed by one frame-time with respect to the first, the third channel by two frame-times with respect to the first, and so on. Pre-processing of the video signal involves analysis of the picture content of the signal, and the provision of delimiting codes to define sets of frames that are to be represented in the recording by a single frame. The pre-processed video and audio tapes are then played back in synchronism, and the disc recording device is enabled for recording the last frame of each of the frame sets defined by the frame set delimiters. A frame repeat count is generated for each frame set, and is encoded in the vertical blanking interval of the video signal. In the presently preferred embodiment of the invention, the audio signals associated with the plurality of audio channels are multiplexed in pairs, then each multiplexed pair is used to modulate a subcarrier. The subcarriers are supplied, together with the video signal, to a modulator in which there is generated a frequency-modulated signal containing both video and audio information. In the particular embodiment of the invention as disclosed, the modulated signal controls the intensity of a laser beam employed to make a recording on a specially treated recording surface of the disc.

In the reproducing system of the invention, the audio signals are recovered from the composite recorded signal by bandpass filtering, demodulation, and demultiplexing. The video signal is simultaneously processed to generate a frame synchronization signal, and to decode the frame repeat count. The reproducing system includes a counter in which the frame repeat count is first stored upon detection, and is then counted down upon the detection of subsequent frames of video information. The contents of the counter are then used to select an appropriate audio signal for reproduction with the video frame being reproduced, and are also used to generate a read/repeat signal, which is employed to control the position of a reading transducer, in order either to repeat reading of the frame currently being processed or to read the next frame from the disc.

It will be appreciated from the foregoing that the present invention represents a significant advance in the field of video disc recording and reproducing systems. In particular, it provides a convenient technique for increasing the effective storage capacity of a recording disc without substantial loss in reproduction fidelity. Other aspects and advantages of the invention will become apparent from the following more detailed description, taken in conjunction with the accompanying drawings.

DETAILED DESCRIPTION

Figure 4:
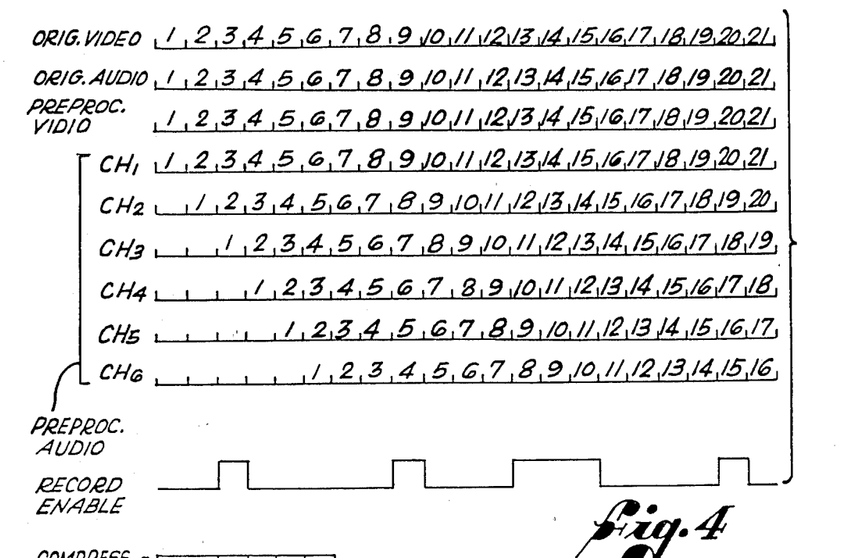
FIG. 4 is a diagram showing the timing relationships between the original video and audio signals to be recorded, pre-processed video and audio signals, and a record-enable signal generated in the recording system of the invention.

As shown in the drawings for purposes of illustration, the present invention is concerned with a video recording and reproducing system in which the video portion of the signal to be recorded can be selectively compressed for purposes of recording on a disc. As best shown in FIG. 4, a conventional video signal comprises a sequence of video frames of information, where each frame represents a complete scan of a video picture. Conventionally, a frame includes two interlaced fields, where one such field is formed by scanning odd-numbered lines of the frame and the other field is formed by scanning even-numbered lines. Many video programs contain relatively long periods during which there is little or no change in picture content, as when still scenes are being displayed. Recording space on a disc can be conserved if only a single frame is recorded to represent a number of consecutive frames of practically the same content, and the frame is subsequently reproduced several times to simulate the original video program.

Figures 5, 7:
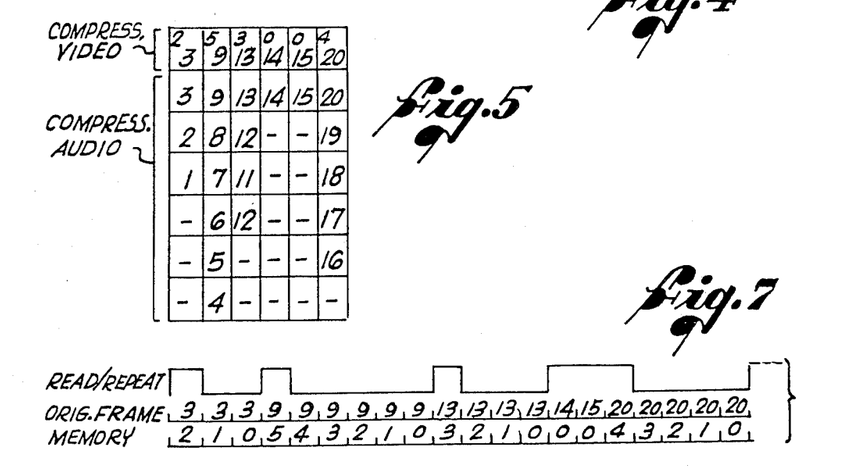
FIG. 5 is a diagram showing the sequence of recorded video and audio frames after compression, as recorded on a video disc.
FIG. 7 is a diagram showing the timing relationships between a read/repeat signal generated in the reproducing system of the invention, and the contents of a memory device in the reproducing system.

In accordance with the present invention, each frame of video information recorded on a video recording disc has encoded with it a frame repeat count indicative of the number of times that the recorded frame is to be repeated during the reproduction phase. Thus, as shown in FIG. 5, frame #3 is to be repeated twice, frame #9 five times, frame #13 three times, frames #14 and #15 not repeated at all, and frame #20 repeated four times. It will be apparent that, in the example shown, the first twenty frames of the video program have been compressed to six frames. Naturally, the overall ratio by which the video information can be compressed will depend upon the content of the program. Programs such as fast moving sports events may not be suitable for compression at all, while other programs may yield compression ratios of three or more, depending upon the program content and the maximum number of times that a frame may be repeated. As also indicated in FIG. 5, multiple channels of audio information must be recorded with each frame of video information. Thus, for example, there must be recorded with video frame #3 the audio information for frames #1, #2 and #3.

Figure 1:
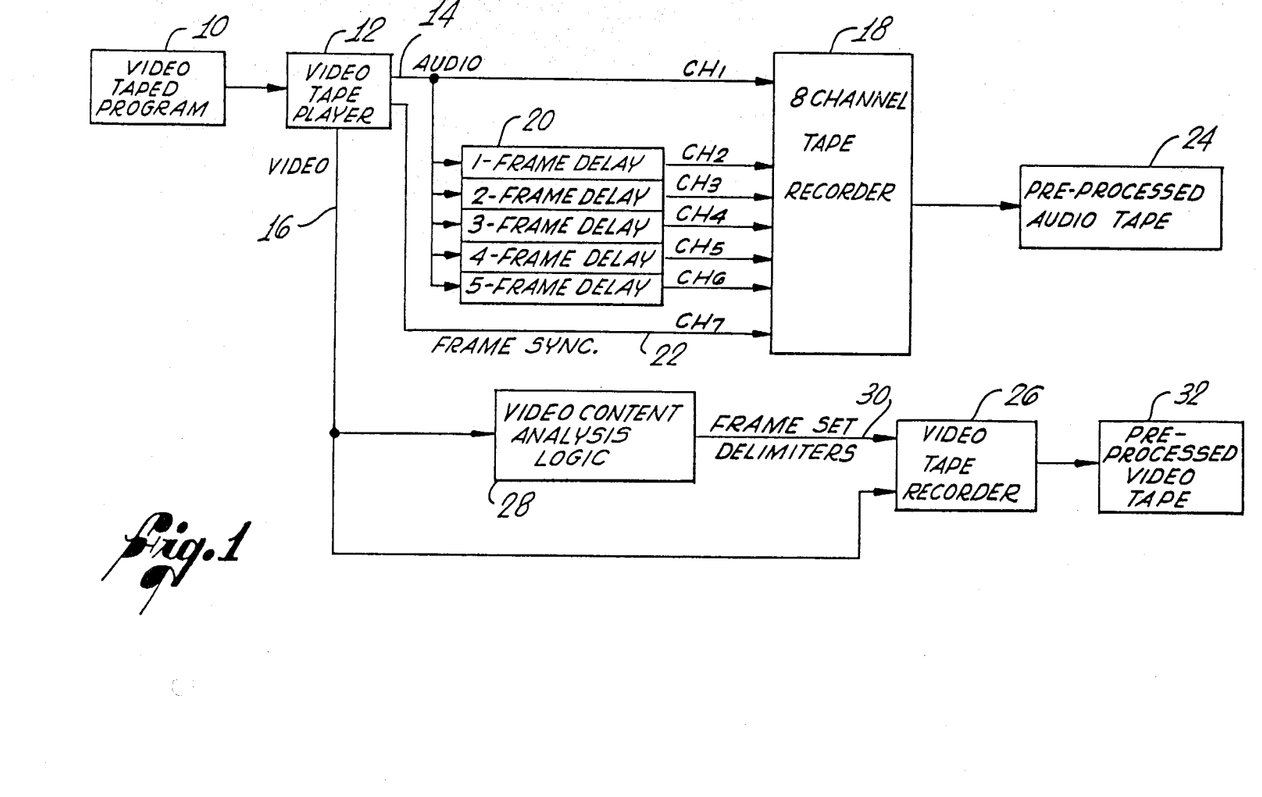
FIG. 1 is a block diagram of apparatus for pre-processing a video program to be recorded in accordance with the present invention.

It is contemplated that the principles of the invention could be implemented in a variety of specific embodiments. In the illustrative embodiment shown, however, a video program in taped form, indicated by reference numeral 10 in FIG. 1, is first reproduced on a video tape player 12, from which is obtained an audio signal on line 14 and a video signal on line 16. The audio signal on line 14 is transmitted to the first channel of an eight-channel audio tape recorder 18, and is also transmitted to a plurality of time delay circuits 20, and thence to other channels of the audio tape recorder. In the example shown, there are five such delay devices 20, having one, two, three, four and five frame delay times, respectively. Thus, the audio signals recorded on channels 2-6 of the tape recorder 18 are delayed by one, two, three, four and five frame times, respectively. A seventh channel of the audio recorder 18 is used to record a frame synchronization signal, as indicated by line 22 from the video tape player 12 to the recorder 18. This synchronization signal is used in a subsequent step to synchronize operation of the eight-channel recorder 18 with a tape player. The eight-channel tape produced by the recorder 18 is indicated by reference numeral 24.

The video signal on line 16 is transmitted directly to a video tape recorder 26, and is also transmitted to video content analysis logic 28. Clearly, there are at least two possible techniques for analyzing the content of the video picture in order to determine how the program may be compressed into a lesser number of frames. In the simplest, although not the most efficient technique, the logic 28 would include a video editing device, which would allow the tape in the player 12 to be stopped, started or reversed, so that the picture content of each frame could be examined carefully and compared with the picture content of prior and subsequent frames. The logic 28 also includes means for generating a flag or delimiter signal that is encoded with the video signal in the recorder 26, as indicated by line 30.

The delimiter can be in the form of a high-frequency signal placed in a particular position in the vertical blanking interval preceding a frame. Presence of the delimiter indicates that the next following frame is the last one of a set of frames considered to be similar enough that they may be represented by a single frame, to be later reproduced the same number of times as there are frames in the set. The video tape recorder 26 thereby produces a pre-processed video tape 32 containing exactly the same video information as the original taped program 10, but having frame set delimiters encoded with the video information, to indicate the last frames of the frame sets defined as a result of the operation of the analysis logic 28.

In a more automated system, the video content analysis logic 28 could be made entirely automatic. Various signal processing systems are available for detecting motion in a video picture, and one of these could be readily adapted to generate frame set delimiters on line 30 in accordance with the detected changes in the picture content. If such a system were employed, the transfer of information from the video tape player 12 to the pre-processed tape 32 could be accomplished in real time, at full speed of operation of the player and recorder. When the aforedescribed manual system of picture content analysis is employed, the video tape player 12 and the video tape recorder 26 are operated on an intermittent basis while the content analysis is being performed, and the generation of the pre-processed audio tape 24 can then be more conveniently performed as a separate operation from that of generating the pre-processed video tape 32.

FIG. 4 indicates the relationship between the original video and audio signals, and the pre-processed video and audio signals. It will be seen that the pre-processed video signal is identical to the original video signal, on a frame-to-frame basis, except that the pre-processed video signal contains delimiting flags, each indicated by a dot preceeding the final frame in each frame set that is to be represented by a single frame. Thus, for example, frame #3 includes a frame set delimiter, indicating that frames #1, #2, and #3 are to be represented by frame #3 repeated twice, i.e., played three times. It will also be apparent from FIG. 4 that the second channel of pre-processed audio information is delayed one frame-time from the first, that the third channel is delayed one further frame-time from the second, and so on. Thus, the third frame of pre-processed audio information, i.e., the frame corresponding to the third frame of pre-processed video information, contains original audio frames #3, #2 and #1 of audio information. As will be seen later, when frame #3 of the original video signal is reproduced for the first time, frame #1 of the audio signal is reproduced, then when frame #3 is repeated for second and third times, frames #2 and #3, respectively, of the audio information are reproduced. In similar fashion, it will be apparent that when frame #9 of the original video signal is reproduced, it will be played a total of six times, and the audio information that accompanies it will be frames #4-9 of the original audio information, all of which are recorded in a single compressed frame with frame #9 of the video information, as shown in FIG. 5.

Figure 2:
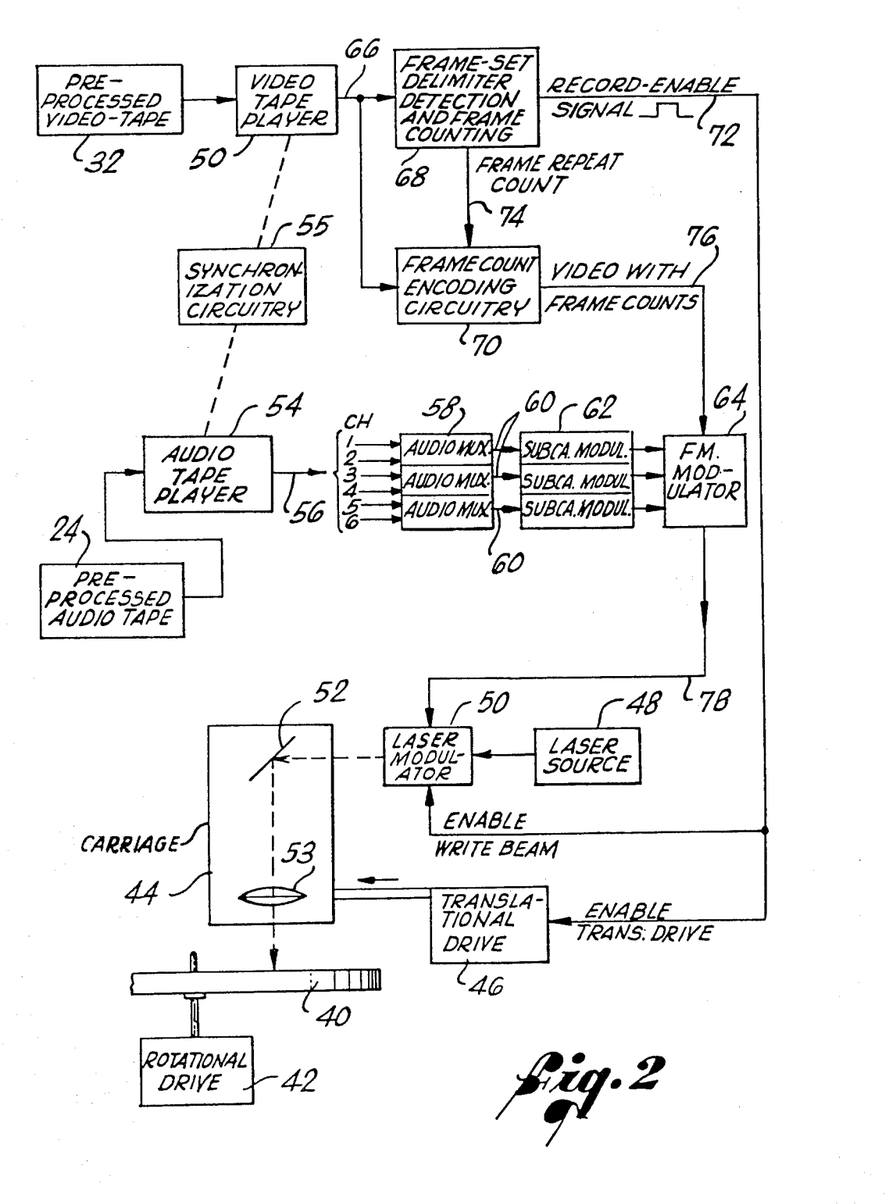
FIG. 2 is a block diagram of a recording system for generating a master disc in accordance with the principles of the present invention.

FIG. 2 illustrates how the pre-processed video tape 32 and the pre-processed audio tape 24 are transferred to a master recording disc, indicated at 40. The disc 40 is rotated at a constant speed by a rotational drive 42, and has associated with it a radially translatable carriage 44, moved by a translational drive 46. In the recording system shown, a laser light source 48 produces a coherent light beam, the intensity of which is modulated by a laser modulator 50. The modulated light beam is reflected from a mirror 52 and passed through an objective lens system 53, which focuses the beam on the surface of the disc 40. The surface of the disc 40 is physically altered in some manner by the impingement of the beam thereon, such as by the formation of depressions in the surface. The mirror 52 and the objective lens system 53 are disposed on the carriage 44, and the light beam from the laser modulator 50 is directed at the mirror 52 in a radial direction with respect to the disc 40. Accordingly, movement of the carriage 44 in a radial direction at a constant speed results in a spiral recording track being formed on the disc 40. Typically, a frame of video information is recorded during one complete revolution of the disc 40.

The pre-processed video tape 32 is reproduced on a video tape player 50, the pre-processed audio tape 24 is reproduced on an audio tape player 54, and synchronization circuitry 55 is provided to synchronize operation of the video tape player and audio tape player. This is accomplished by means of the frame synchronization signal recorded on channel seven of the pre-processed audio tape 24 during pre-processing of the audio signals.

It will be appreciated that, as an alternative to the preprocessing steps described with respect to FIG. 1, the required six audio channels could be produced at the time the master disc is recorded. The pre-processed video tape 32 would also contain all of the original audio information, which could be reproduced in the tape player 50 and processed by time delay circuits similar to the circuits 20 in FIG. 1. The resultant six audio channels would then be utilized in the same way as the six outputs from the audio tape player 54. In this alternative embodiment of the invention, the synchronization circuitry 55 would not be required.

The audio tape player 54 in FIG. 2 reproduces the six channels of audio information, as indicated by line 56. These six channels are transmitted to three audio multiplexers 58, each of which time-division multiplexes two of the audio channels. Three multiplexed audio signals are thereby derived on lines 60 from the audio multiplexers 58, and are transmitted to three subcarrier modulators 62, and thence to an fm modulator 64.

Simultaneously with the processing of the audio information as described, the video tape player 50 produces a video signal on line 66, which is connected to logic 68 for detecting frame set delimiters and for performing frame counting operations, and is also connected to frame count encoding circuitry 70. The logic in block 68 detects the frame set delimiters, which were encoded with the video signal by the pre-processing circuitry shown in FIG. 1. Whenever a delimiter is detected, a record-enable signal is generated on line 72 for the duration of the frame in which the delimiter was encoded. A typical waveform of the record-enable signal is shown in FIG. 4, and it will be seen that the signal is generated during frames #3, #9, #13, #14, #15 and #20, these being the only frames at the beginning of which a delimiter is encoded.

The record-enable signal on line 72 is transmitted to the laser modulator 50, where it is operative to enable transmission of the light beam from the modulator. When the enable signal is in a low state, as illustrated in FIG. 4, no light is emitted from the laser modulator 50, and recording is suspended. The record-enable signal on line 72 is also connected to the translational drive 46, so that the drive 46 moves the carriage 44 only when the record-enable signal is in a high state, indicating that a frame is to be recorded. It will be appreciated, therefore, that recording is permitted to take place only during those frames flagged by the delimiter signal, as indicated in FIGS. 4 and 5.

Figure 6:
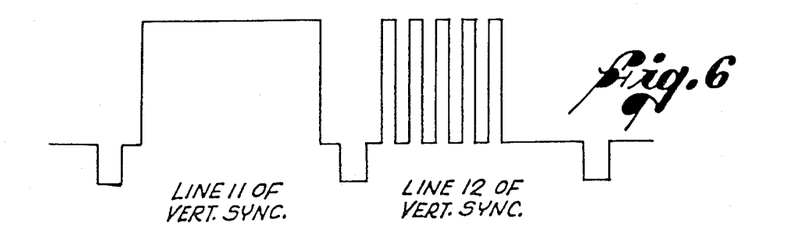
FIG. 6 shows the waveform of a frame synchronization signal and a frame repeat count encoded in a vertical blanking interval of a composite video and synchronization signal.

The frame set delimiter detection logic also generates a frame repeat count on line 74, and this is conveyed to the frame count encoding circuitry 70. This circuitry encodes the frame repeat count in the vertical blanking interval preceding each frame. This encoding may be accomplished in a variety of ways, but one convenient technique is to insert bursts of a high-frequency signal in a selected line of the vertical blanking interval. As shown in FIG. 6, line #11 of the vertical blanking interval preceding a frame is used for storage of a frame synchronization flag, and line #12 is used for storage of the frame repeat count. Any convenient frequency for these signals could be employed, 115 kilhertz being suggested as a convenient figure. By way of illustration in FIG. 6, there are five bursts of the signal, indicating a repeat count of five, such as would be stored in the blanking interval preceeding frame #9, as indicated in FIG. 5.

The frame count encoding circuitry 70 generates on line 76 a video signal equivalent in most respects to the original video signal, but with frame counts stored at the beginning of the last frame of each selected frame set. In the example given in FIGS. 4 and 5, the frame counts would be stored at the beginning of frames #3, #9, #13, #14, #15 and #20. The frame synchronization signal also shown in FIG. 6 can be inserted either by the frame count encoding circuitry 70, or by the pre-processing circuitry shown in FIG. 1.

The video signal on line 76 from the frame count encoding circuitry 70 is passed to the fm modulator 64, together with the audio signals from the subcarrier modulators 62. The modulator 64 generates a composite video and audio signal on line 78, which is coupled to the laser modulator 50 to modulate the light beam from the laser source 48. It will be appreciated that the video signal on line 78 is not compressed in any way. Compression is effected by means of the record-enable signal on line 72. As already mentioned, this signal has the effect of enabling the light beam only during selected frames, and simultaneously enabling the translational drive 46 to move the light beam radially across the disc 40 during the same selected frames. The resultant recording on the master disc 40 is in the format shown in FIG. 5. Only frames #3, #9, #13, #14, #15 and #20 are recorded, together with corresponding audio information as shown in FIG. 5. It will be understood that production recordings can be made from the master disc 40 by processes that form no part of the present invention, and that these production recordings can be made available to the public for reproduction on a suitably modified reproducing system, as will now be discussed in relation to FIG. 3.

Figure 3A:
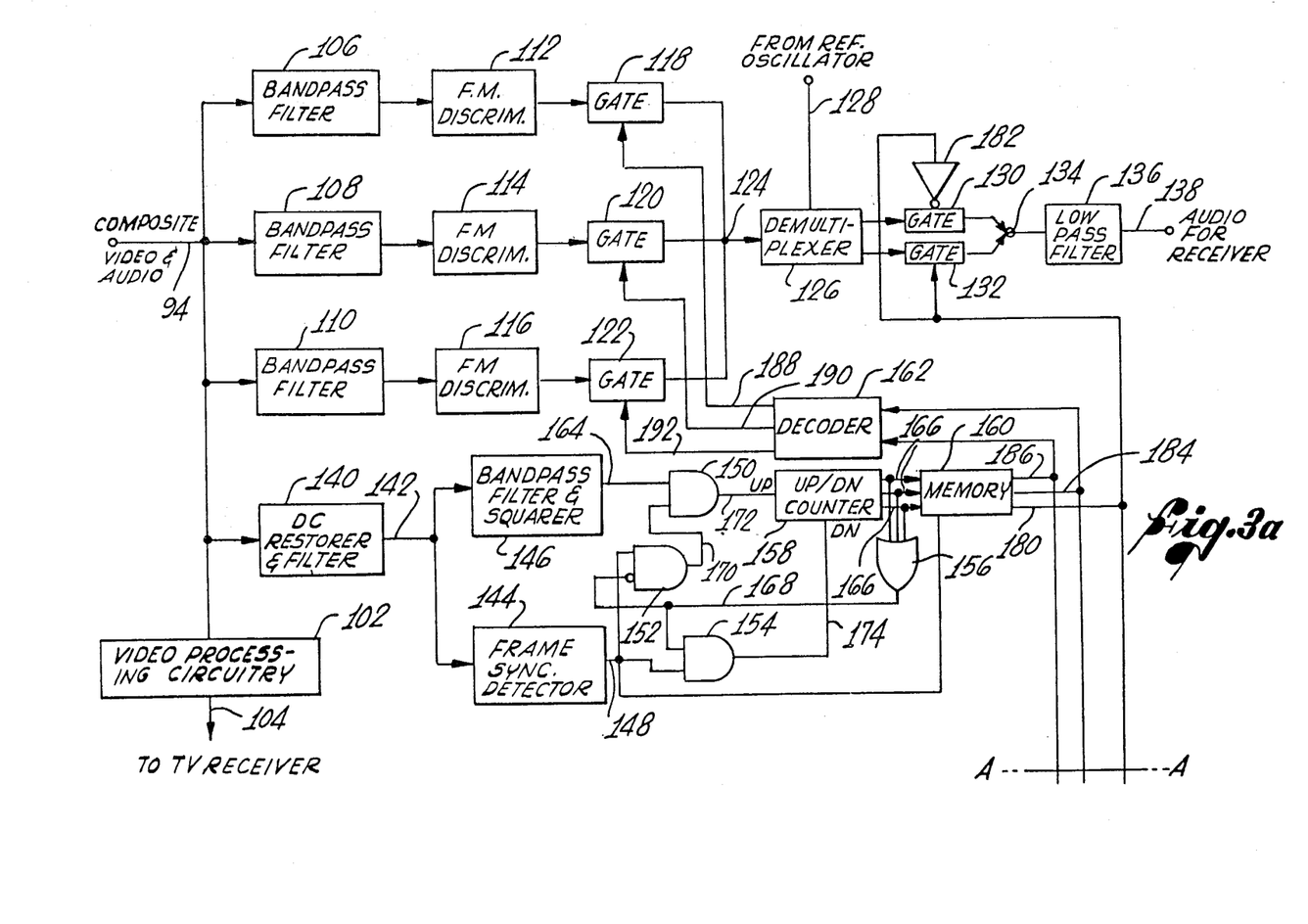
FIG. 3, consisting of A & B, is a simplified schematic and block diagram of a reproducing system constructed in accordance with the principles of the present invention.
Figure 3B:
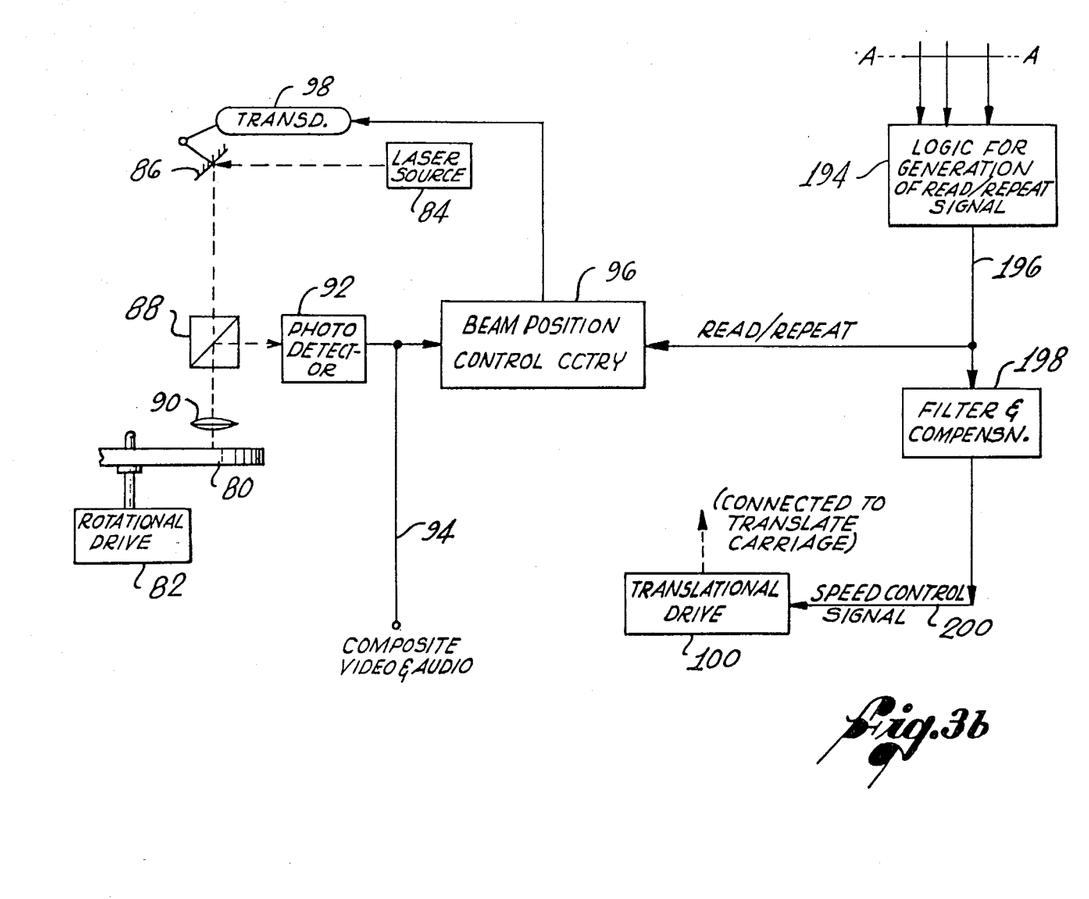

The video disc reproducing system is similar in many respects to the master recording system described in FIG. 2. A disc 80 on which has been recorded the compressed video and audio information, as described with respect to FIG. 2, is rotated at a constant speed by a rotational drive 82. A laser source 84 directs a coherent light beam, referred to as the reading beam, onto a mirror system 86, and thence through a prism 88 and an objective lens system 90, to impinge on the disc 80. In the reproduction process, the reading beam is selectively reflected from the disc, depending on the information content recorded thereon, and light reflected from the disc is reflected out of the path of the reading beam by the prism 88, and thence into a photodetector system 92, from which is derived a composite video and audio signal, on line 94. Since there may be eccentricity and other errors in the production disc 80, the signal from the photodetectors 92 is also processed by beam position control circuitry 96, one function of which is to maintain the reading beam centered as closely as possible on the recording track, by means of a transducer 98 coupled to make continual adjustments to the mirror system 86, in order to direct the reading beam appropriately onto the surface of the disc 80. The mirror system 86, the prism 88 and the objective lens system 90 are all disposed upon a carriage (not shown), which is translated radially by a translational drive 100.

The composite video and audio signal derived from the disc 80 is connected to conventional video processing circuitry 102, which effects demodulation of the signal, after which it may be passed directly to a television monitor, or may be remodulated, if it is to be transmitted to a conventional television receiver, as indicated by line 104. The composite video and audio signal on line 94 is also connected to three bandpass filters 106, 108 and 110, from which are obtained the three modulated subcarriers containing the six channels of audio information. The outputs of the bandpass filters 106, 108 and 110 are passed to three corresponding fm discriminators 112, 114 and 116, which demodulate the respective signals on the three subcarriers. The outputs of the discriminators 112, 114, and 116 are then passed through corresponding gates 118, 120 and 122, and thence to a junction 124, which is connected to provide an input signal to a demultiplexer 126. As will be explained shortly, the gates 118, 120 and 122 are selectively operated such that only one gate is opened or turned on at any given time, and only one of the selected demodulated audio signals is passed to the demultiplexer 126. The demultiplexer 126 employs a reference signal from a reference oscillator, as indicated by line 128, and supplies two demultiplexed audio outputs to two additional gates 130 and 132, respectively. The outputs of these gates are connected to a common junction point 134, and thence to a low-pass filter 136. The low-pass filter 136 reduces noise, and filters out any contribution from the audio subcarriers. The output of the filter 136, on line 138, may then be remodulated for transmission to a conventional television receiver, along with the video signal on line 104.

The composite video and audio signal on line 94 is also transmitted to a dc restorer and filter circuit 140, the output of which, on line 142, is utilized to detect frame synchronization signals, in block 144, and to detect frame repeat counts, in a bandpass filter and squarer circuit 146. The frame synchronization detector 144 generates an output on line 148 upon the detection of a frame synchronization signal in the vertical blanking interval of the video signal received. This synchronization signal and the count derived in the bandpass filter and squarer circuit 146 are processed by additional logic comprising three AND gates 150, 152 and 154, an OR gate 156, an UP/DOWN counter 158, a binary memory circuit 160, and a binary-to-decimal decoder 162.

The frame synchronization signal on line 148 is applied as an input to AND gate 152, and as an input to AND gate 154, and the output of the bandpass filter and squarer 146 is applied as an input to AND gate 150, over line 164. The UP/DOWN counter 158 is a three-bit counter having three output lines 166 connecting the counter to the memory 160, and also supplying three inputs to the OR gate 156. The output of the OR gate 156, on line 168, is applied as a second input to AND gate 154, and is inverted and applied as a second input to AND gate 152. The output of AND gate 152, on line 170, is applied as an input to AND gate 150, the output of which, on line 172, is connected to the UP counting terminal of the UP/DOWN counter 158. The output of AND gate 154, on line 174, is connected to the DOWN counting terminal of the counter 158.

In operation, the UP/DOWN counter 158 is counted in an upward sense by encoded frame repeat count pulses detected in the bandpass filter and squarer 146, and is counted in a downward sense by subsequent frame synchronization pulses passing through the AND gate 154. More specifically, when the UP/DOWN counter 158 contains a zero count, the output of OR gate 156 will be zero, and this will enable AND gate 152 to pass a horizontal synchronization pulse over line 170, thereby enabling AND gate 150. The horizontal synchronization pulse generated on line 148 is of long enough duration to enable AND gate 150 during the occurrence of frame repeat count pulses generated in the bandpass filter and squarer. The bandpass filter and squarer 146 detect the frame repeat count pulses, and generate therefrom square-shaped pulses to count the UP/DOWN counter 158 in an upward direction when applied over line 172. Accordingly, when the UP/DOWN counter is zero, and the frame repeat count is detected, the counter 158 is counted upwardly by the amount of the encoded repeat count.

It will be appreciated that the logic diagram shown in FIG. 3 is somewhat simplified, and that appropriate conventional timing and signal shaping circuitry would be needed, for example, to ensure that the signal on line 168 from the OR gate 156 persisted for long enough to allow gating of the frame repeat count pulses into the UP/DOWN counter 158.

On the occurrence of the next frame synchronization pulse on line 148 after detection of a frame repeat count, there will be a non-zero value in the UP/DOWN counter 158, and therefore a non-zero signal on line 168 from the OR gate 156. Accordingly, AND gate 154 will be enabled, and the horizontal synchronization pulse will be gated through AND gate 154 and over line 174 to count the UP/DOWN counter in a downward direction. The same chain of events will occur for subsequent horizontal synchronization pulses on line 148, until such time as the UP/DOWN counter 158 is counted down to a zero value, at which time a new frame repeat count will be gated through AND gate 150, to count the UP/DOWN counter upwardly again.

Frame synchronization pulses on line 148 are also utilized to gate the contents of the UP/DOWN counter 158 into the memory 160, where it can be utilized to select an appropriate audio channel for reproduction, and to generate a read/repeat signal for control of the reading beam in the disc reproduction system. More specifically, the least significant digit of the count in the memory 160 is utilized to select one of the gates 130 and 132 located in the lines from the demultiplexer 126. This least significant bit output of the memory, indicated on line 180, is connected directly to the gating terminal of gate 132, and is also connected through an inverter 182 to the gating terminal of gate 130. Thus, when the count in the memory 160 is even-numbered, gate 130 is enabled, and when the count in the memory is odd-numbered, gate 132 is enabled. The two higher-order bits in the memory 160, as indicated on output lines 184 and 186, are connected to the input of the binary to decimal decoder 162, which produces an output signal on one of three output lines 188, 190 and 192. These output lines are connected to the gating terminals of gates 118, 120 and 122 respectively, so that a count of zero or one in the memory 160 will enable gate 118, while a count of two or three will enable gate 120, and a count of four or five will enable gate 122. In this manner, the count in the memory 160 determines which of gates 118, 120 and 122 will be enabled, and which of gates 130 and 132 will be opened, in order to select the correct audio frame for reproduction with a corresponding video frame.

The contents of the memory 160, on lines 180, 184 and 186, are also supplied to logic for generation of a read/repeat signal, indicated in block 194. This signal determines whether the disc reading apparatus should read the next frame recorded on the disc, or should repeat reading of the same frame over again.

FIG. 7 shows a typical waveform of the read/repeat signal, using the same example of the compressed video signal that was shown in FIG. 5. Immediately below the read/repeat signal is the corresponding number of the original frame from which the recording is derived, and immediately below that are the corresponding counts in the memory 160 during the playback operation. For the purpose of reading the first frame of data from the disc the read/repeat signal is in the "read" state initially, then changes to the "repeat" state for the subsequent two frames, during which original frame #3 is repeated two additional times. Next, the read/repeat signal changes to the "read" state in order to read frame #9 from the disc, and then reverts to the "repeat" state for the subsequent five frame times, during which the same frame is repeated five times. This read/repeat signal is transmitted over line 196 to the beam position control circuitry 96, which, in addition to its other functions, directs the mirror 86 and the reading beam to either read the next track and frame on the disc, or to repeat reading of the last frame to be reproduced.

The read/repeat signal on line 196 is also processed by a low-pass filter and other compensation circuitry in block 198, for generation of a speed control signal, on line 200, for application to the translational drive 100. It will be appreciated that the read/repeat signal represents the speed control signal that should theoretically be applied to the translational drive 100 in order to translate the beam across the disc. However, a precise stopping and starting function for the translational drive 100 would be impractical to implement at low cost for a consumer product of the type contemplated, so the read/repeat signal is first low-pass filtered to eliminate any rapid changes in the speed control signal to be applied to the translational drive over line 200. Since a filtered signal is used to control the translational drive speed, the translational drive 100 will not then exactly follow the desired variations in radial position of the reading beam. However, positional errors caused by this technique can be compensated for by appropriate movements of the mirror 86, as controlled by the beam position control circuitry 96. The mirror 86 can be pivoted through a large enough angle to swing the beam through a distance corresponding to as many as 15 to 20 tracks, so that the translational drive 100 can lead or lag the theoretical desired radial displacement by this amount.

It will be appreciated that the invention described herein represents a significant advance in the field of video recording generally, and more particularly in video disc recording and reproducing systems. The invention provides for the production of disc video programs with significantly longer program times than would otherwise be obtainable, and makes efficient use of the storage space on a disc by eliminating redundant video information from the original program, all without significant loss of program content. In addition it provides a related technique for preserving a continuous audio information signal in compressed form, and recreating the continuous audio signal during the reproduction phase. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A video reproducing system comprising:
a recording medium having recorded thereon frames of video information, encoded frame repeat counts indicative of the number of times each of the recorded frames is to be reproduced, and a plurality of channels of audio information associated with each frame;
transducer means for reading the recorded information from said recording medium and producing therefrom a corresponding electrical signal;
drive means for moving said transducer means with respect to said recording medium;
means for decoding the frame repeat counts encoded in the recorded video signal;
means responsive to the decoded repeat count, for controlling the position of said transducer means in such a manner as to read each frame of video information a selected number of times;
bandpass filter means, for separating the audio channel subcarriers;
a plurality of demodulators, for demodulating each subcarrier to obtain a multiplexed audio signal;
demultiplexing means to derive two audio channels from a selected multiplexed audio signal;
and means for selecting one of said audio channels for reproduction, based upon the value of the decoded repeat count and the number of times that a frame has already been repeated;
wherein said means responsive to the decoded repeat count includes an up/down counter capable of assuming a zero or non-zero count condition;
means for detecting a zero count condition in said counter;
means responsive to said means for detecting a zero count condition and operative when said counter is at a zero count, for incrementing said counter by the value of a decoded frame repeat count;
means responsive to said means for detecting a zero count condition and operative when said counter is at a non-zero count, for decrementing said counter by one for each frame reproduced by said transducer means; and
means for generating a read/repeat signal based on the value stored in said counter, wherein said transducer means is directed to read a new frame when the value in said counter is zero, and to repeat a frame when the value in said counter is non-zero.

2. A video reproducing system as set forth in claim 1, wherein said means for selecting one of said audio channels includes gating means coupled to said counter, for selecting only one of said channels based on the current value stored in said counter.

3. A video reproducing system as set forth in claim 1, wherein said means for separating and decoding the plurality of audio channels includes:
bandpass filter means, for separating the audio channel subcarriers;
a plurality of demodulators, for demodulating each subcarrier to obtain a multiplexed audio signal; and
demultiplexing means to derive two audio channels from a selected multiplexed audio signal.

4. A video reproducing system as set forth in claim 3, wherein said means for selecting one of said audio channels includes:
first gating means for selecting the output from one of said demodulators, based on the value stored in said counter, exclusive of its least significant bit; and
second gating means for selecting one of the two audio channels supplied from said multiplexing means, based on the value of the least significant bit in said counter.

5. A video reproducing system as set forth in claim 1, and further including means coupling said read/repeat signal to said drive means, to vary the speed thereof in accordance with the degree to which reproduced video information is repeated.

6. A video reproducing system as set forth in claim 5, wherein:
said means coupling said read/repeat signal to said drive means includes a low-pass filter to minimize sudden speed changes in said drive means; and
said system further includes a fast-response transducer-translating means capable of maintaining said transducer at a given recording track position, and capable of compensating for lagging or leading movements by said drive means.

7. A video disc reproducing system, comprising:
a disc having recorded thereon frames of video information, encoded frame repeat counts indicative of the number of times each of the recorded frames is to be reproduced, and a plurality of channels of audio information associated with each frame;
a laser light source for generating a reading beam;
an optical system for directing the reading beam onto the disc and isolating a reflected beam modulated in accordance with the recorded information;
rotational drive means for rotating the disc at a constant angular velocity;
translational drive means for moving at least a portion of said optical sysatem radially with respect to said disc, and thereby moving the reading beam across said disc;
transducer means for transforming the reflected beam into a corresponding electrical signal;
beam position control means, for maintaining the reading beam practically centered on a recording track on said disc;
means for decoding the frame repeat counts encoded in the recorded video signal;
means responsive to the decoded repeat count, for controlling said translational drive means and said beam position control means in such a manner as to read each frame of video information a selected number of times;
bandpass filter means, for separating the audio channel subcarriers;
a plurality of demodulators, for demodulating each subcarrier to obtain a multiplexed audio signal;
demultiplexing means to derive two audio channels from a selected multiplexed audio signal;
and means for selecting one of said audio channels for reproduction, based upon the value of the decoded repeat count and the number of times that a frame has already been repeated.

8. A video disc reproducing system, comprising:
a disc having recorded thereon frames of video information, encoded frame repeat counts indicative of the number of times each of the recorded frames is to be reproduced, and a plurality of channels of audio information associated with each frame;
a laser light source for generating a reading beam;
an optical system for directing the reading beam onto the disc and isolating a reflected beam modulated in accordance with the recorded information;
rotational drive means for rotating the disc at a constant angular velocity;
translational drive means for moving at least a portion of said optical system radially with respect to said disc, and thereby moving the reading beam across said disc;
transducer means for transforming the reflected beam into a corresponding electrical signal;
beam position control means, for maintaining the reading beam practically centered on a recording track on said disc;
means for decoding the frame repeat counts encoded in the recorded video signal;
means responsive to the decoded repeat count, for controlling said translational drive means and said beam position control means in such a manner as to read each frame of video information a selected number of times;
bandpass filter means, for separating the audio channel subcarriers;
a plurality of demodulators, for demodulating each subcarrier to obtain a multiplexed audio signal;
demultiplexing means to derive two audio channels from a selected multiplexed audio signal;
and means for selecting one of said audio channels for reproduction, based upon the value of the decoded repeat count and the number of times that a frame has already been repeated;
wherein said means responsive to the decoded repeat count includes an up/down counter capable of assuming a zero or non-zero count condition;
means for detecting a zero count condition in said counter;
means responsive to said means for detecting a zero count condition and operative when said counter is at a zero count, for incrementing said counter by the value of a decoded frame repeat count;
means responsive to said means for detecting a zero count condition and operative when said counter is at a non-zero count, for decrementing said counter by one for each frame reproduced by said transducer means; and
means for generating a read/repeat signal based on the value stored in said counter, wherein said transducer means is operated to read a new frame when the value in said counter is zero, and to repeat a frame when the value in said counter is non-zero.

9. A video reproducing system as set forth in claim 8, wherein said means for selecting one of said audio channels includes gating means coupled to said counter, for selecting only one of said channels based on the current value stored in said counter.

10. A video reproducing system as set forth in claim 8, wherein said means for separating and decoding the plurality of audio channels includes:
bandpass filter means, for separating the audio channel subcarriers;
a plurality of demodulators, for demodulating each subcarrier to obtain a multiplexed audio signal; and
demultiplexing means to derive two audio channels from a selected multiplexed audio signal.

11. A video reproducing system as set forth in claim 10, wherein said means for selecting one of said audio channels includes:
first gating means for selecting the output from one of said demodulators, based on the value stored in said counter, exclusive of its least significant bit; and
second gating means for selecting one of the two audio channels supplied from said multiplexing means, based on the value of the least significant bit in said counter.

12. A video reproducing system as set forth in claim 8, and further including means coupling said read/repeat signal to said translational drive means, to vary the speed thereof in accordance with the degree to which reproduced video information is repeated.

13. A video reproducing system as set forth in claim 12, wherein:
said means coupling said read/repeat signal to said translational drive means includes a low-pass filter to minimize sudden speed changes in said translational drive means; and
said beam position control means is operative to compensate for lagging or leading movements of said translational drive means.

* * * * *